US00RE40885E

(19) United States
(12) Reissued Patent
Sharp

(10) Patent Number: US RE40,885 E
(45) Date of Reissued Patent: Sep. 1, 2009

(54) ROBOTIC TAPE APPLICATOR AND METHOD

(75) Inventor: Terrance M. Sharp, Ontario (CA)

(73) Assignee: Henkel Corporation, Gulph Mills, PA (US)

(21) Appl. No.: 11/700,230
(22) Filed: Jan. 31, 2007

Related U.S. Patent Documents

Reissue of:
(64) Patent No.: 7,093,641
Issued: Aug. 22, 2006
Appl. No.: 10/087,930
Filed: Mar. 5, 2002

U.S. Applications:
(60) Provisional application No. 60/272,775, filed on Mar. 5, 2001.

(51) Int. Cl.
*B32B 37/00* (2006.01)

(52) U.S. Cl. ..... 156/574; 156/353; 156/523; 156/577; 156/578

(58) Field of Classification Search ..... 156/523
See application file for complete search history.

(56) References Cited

U.S. PATENT DOCUMENTS

| | | | | | |
|---|---|---|---|---|---|
| 3,740,297 | A | * | 6/1973 | Vidinsky | 156/523 |
| 4,130,873 | A | | 12/1978 | Fioretta et al. | 364/513 |
| 4,382,836 | A | | 5/1983 | Frank | 156/459 |
| 4,750,966 | A | | 6/1988 | Koller | 156/391 |
| 4,759,810 | A | | 7/1988 | Jackson et al. | 156/64 |
| 4,885,981 | A | | 12/1989 | Roettger et al. | 92/59 |
| 4,978,417 | A | | 12/1990 | Grimshaw et al. | |
| 4,980,011 | A | | 12/1990 | Gruber et al. | 156/361 |
| 4,997,513 | A | | 3/1991 | Lengen et al. | 156/523 |
| 5,041,179 | A | | 8/1991 | Shinno et al. | 156/64 |
| 5,342,647 | A | | 8/1994 | Heindel et al. | 427/2.31 |
| 5,352,306 | A | | 10/1994 | Grimshaw et al. | 156/64 |
| 5,462,633 | A | | 10/1995 | Manusch et al. | 156/64 |
| 5,536,342 | A | | 7/1996 | Reis et al. | 156/64 |
| 5,709,162 | A | | 1/1998 | Pagett et al. | 112/470.07 |
| 5,714,034 | A | | 2/1998 | Goodhue | 156/512 |
| 5,738,749 | A | | 4/1998 | Grimshaw et al. | 156/312 |
| 5,779,830 | A | | 7/1998 | Wakefield et al. | 156/64 |
| 5,830,297 | A | | 11/1998 | Nakahira et al. | 156/64 |
| 5,938,871 | A | | 8/1999 | Nakahira et al. | 156/64 |
| 5,968,297 | A | | 10/1999 | Hooker et al. | 156/64 |
| 6,113,716 | A | | 9/2000 | Schramayr et al. | 156/64 |
| 6,189,587 | B1 | | 2/2001 | Cairns | 156/351 |
| 6,440,249 | B1 | | 8/2002 | Swinburne | 156/230 |
| 6,537,406 | B1 | | 3/2003 | Jensen, Jr. et al. | 156/202 |
| 6,638,590 | B2 | | 10/2003 | Ourth | 428/40.1 |
| 6,645,327 | B2 | | 11/2003 | Austin et al. | 156/64 |
| 2002/0124967 | A1 | | 9/2002 | Sharp | |
| 2003/0109946 | A1 | | 6/2003 | Erickson et al. | |

FOREIGN PATENT DOCUMENTS

| | | |
|---|---|---|
| FR | 2621517 | 4/1989 |
| FR | 2639625 | 6/1990 |
| GB | 2101519 | 1/1983 |
| GB | 2101519 A | 1/1983 |
| WO | WO 95/29116 | 11/1995 |

OTHER PUBLICATIONS

U.S. Utility Appl. No. 10/826,506, Terrance M. Sharp, "Robotic Tape Applicator and Method", filed Apr. 19, 2004, —Specification (22 pp.) & Drawings (11 pp.).
U.S. Utility Appl. No. 10/991,853, Terrance M. Sharp, et al., "Systems and Methods for a Robotic Tape Applicator", filed Nov. 19, 2004, Specification (33 pp.), Drawings (14 pp.).
Publication from Concinnati Milacron, titled "Into the Future, " published 1988.
Publication from Plastics Engineering, titled "R U Reinforcing Plastics With Robots?", published May, 1981.
* cited by examiner

*Primary Examiner*—John L Goff

(57) ABSTRACT

A method of fastening a first curved part to a second curved part comprises placing the second part into a specified orientation in relation to a robotically controlled tape applicator, applying two-sided adhesive tape along a non-linear path over the surface of the second part, and placing the first part into registry with the second part to adhere to the adhesive tape. A robotic tape applicator comprises a computer adapted to control a robotic arm, guide means, tensioning means and cutting means.

31 Claims, 6 Drawing Sheets

ROBOTIC TAPE APPLICATOR AND METHOD

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application claims priority to U.S. Provisional Application Ser. No. 60/272,775, filed Mar. 5, 2001, which is incorporated herein by reference in its entirety.*

FIELD OF THE INVENTION

This invention is in the field of fastening. In particular, it is in the field of fastening two parts together using adhesive tape and robotics.

BACKGROUND OF THE INVENTION

Two-sided adhesive tape finds many uses in industry. For example, a number of manufacturing operations require the placement of a plastic part over another part typically made of metal or plastic. Double-sided adhesive tape is used to adhere one piece to the other.

In any assembly line production, the goal is to produce a product with a minimum of cost. In particular, in the automotive industry, cost savings are of great importance. Time and motion studies are often performed to ensure that certain operations on an assembly line are performed in the most efficient manner possible. With practice, a worker's performance can be optimized.

In the automotive industry, it is desirable to produce a variety of vehicle models with a minimum of expense. Accordingly, standard body portions made of metal are often modified by using accessories which can be adhered to the regular vehicle body in order to create a different impression. Most often, these plastic additions are molded in non-linear shapes in order to provide visual appeal.

In a typical manufacturing operation, a metal body part is provided to a worker along with a plastic accessory which has been molded into a shape adapted to fit snugly against the surface of the body part. Normally, the worker will apply a band of an activating liquid to the body part surface where the adhesive tape is to be applied. This activator will cause the adhesive tape to stick very strongly to the body part when it has had an opportunity to cure briefly. The worker then applies a line of two-sided tape over the body part surface to which the activator has been applied. The surface of the tape facing the body part is adhesive while the outward facing surface of the tape is covered with a protective strip which prevents the protected side of the tape from sticking to the unprotected side of the tape on a roll, and allows the worker to manipulate the tape without sticking to the outward-facing side thereof. The worker is required to manoeuvre the tape along a non-linear path, and to apply sufficient pressure to the tape in order to "wet out" the tape by removing bubbles in the entrained liquid below. This requires a significant amount of manual dexterity on the part of the worker at various stages including laying down the activator, laying down the tape on top of the activator over the predetermined path, and applying appropriate pressure to the tape in order to ensure that it will be fastened securely and will perform its function adequately.

After the tape has been applied, the backing on the outward face of the tape is removed and the plastic accessory is fastened to the body part.

This entire process is somewhat intricate and time-consuming. Accordingly, it is highly labour intensive. Worker errors are costly, in terms of both additional labour costs, and delays in production.

Accordingly, it would be an advantage to reduce the time required to perform these taping operations while retaining or improving the level of precision of a skilled worker. In addition, it would be an advantage to provide a method of applying tape which is uniform, predictable and reproducible, using an apparatus which is cost-effective.

SUMMARY OF THE INVENTION

Accordingly, in a major aspect of the invention, a method of fastening a first curved part to a second curved part comprises placing the second curved part into a specified orientation in relation to a robotically controlled tape applicator, applying two-sided adhesive tape along a non-linear path over the surface of the second part, and placing the first curved plastic part into registry with the first part to adhere to the adhesive tape.

In a further aspect, the method further comprises applying a liquid activator over the surface of the first part along the path over which the tape is to be applied, prior to applying the tape.

In a further aspect, the liquid activator is applied with a robotically controlled activator applicator.

In a further aspect, the activator applicator forms part of the tape applicator.

In a further aspect of the invention, a robotic tape applicator comprises computer means, tape applicator means under the control of the computer means, and means to hold a work piece in registration with a tape applicator means, such that when the computer means is programmed with data representing the shape of the work piece and the proposed path of the tape to be adhered to the work piece, the tape applicator means is adapted to apply the tape to the work piece along the path.

In a further aspect, the robotic tape applicator further comprises activator applicator means adapted to apply an activator liquid along the predetermined path prior to application of the tape.

In a further aspect, the tape applicator means comprises a tape applicator head, cutting means to slice the tape, and tape braking means adapted to hold the tape stationary during cutting.

In a further major aspect of the invention, a robotic tape applicator comprises a computer adapted to control a robotic arm according to a program, and the robotic arm comprises a roller adapted to releasably store two-sided adhesive tape, guide means to guide the tape to a tape applicator head for application to a work piece, the tape applicator head comprising a nose biased to permit reciprocal motion in a direction normal to the work piece, and cutting means integral with the tape applicator head adapted to cut the tape under the control of the computer.

In further aspects of the invention, the tape applicator further comprises tensioning means located between the roller and the nose adapted to maintain a uniform tension on the tape during tape application.

In a further aspect, the tensioning means comprises a nip roller.

In a further aspect, the tape applicator further comprises braking means adapted to releasably restrain movement of the tape.

In a further aspect, the braking means comprises a spring biased lever adapted to releasably trap the tape.

In a further aspect, the spring biased lever is a adapted to release the tape under pneumatic pressure.

In a further aspect, projections located on either side of the nose and extending beyond the leading edge of the nose a distance less than the thickness of the tape are adapted to contact the work piece while the tape is running between said projections to uniformly compress the tape during tape application.

In further aspect, a hydraulically or pneumatically controlled piston in a compliance cylinder is adapted to maintain a constant pressure on the tape applicator head.

In a further aspect, the cutting means comprises a knife blade located within the perimeter of the tape applicator head when the cutting means is not in operation.

In a further aspect, the tape applicator further comprises a pneumatic or hydraulic blade control piston to control the knife blade operation.

In a further aspect, the tape applicator further comprises a knife blade sensor adapted to detect when the knife blade is fully retracted after the tape is cut and to signal the computer so that tape application can resume.

In a further aspect, the tape applicator further comprises vacuum ports adapted to provide sites of negative pressure against which the tape can be slideably held during application of tape to the work piece.

In a further aspect, the nose of the tape applicator head comprises a smooth radius, the centre point of which radius lies along a roll axis of the robotic arm.

Further aspects of the invention will become apparent from the description which follows.

BRIEF DESCRIPTION OF THE DRAWINGS

The robotic tape applicator of the invention is shown in the attached drawings, wherein.

DETAILED DESCRIPTION OF THE INVENTION

Figure 6:
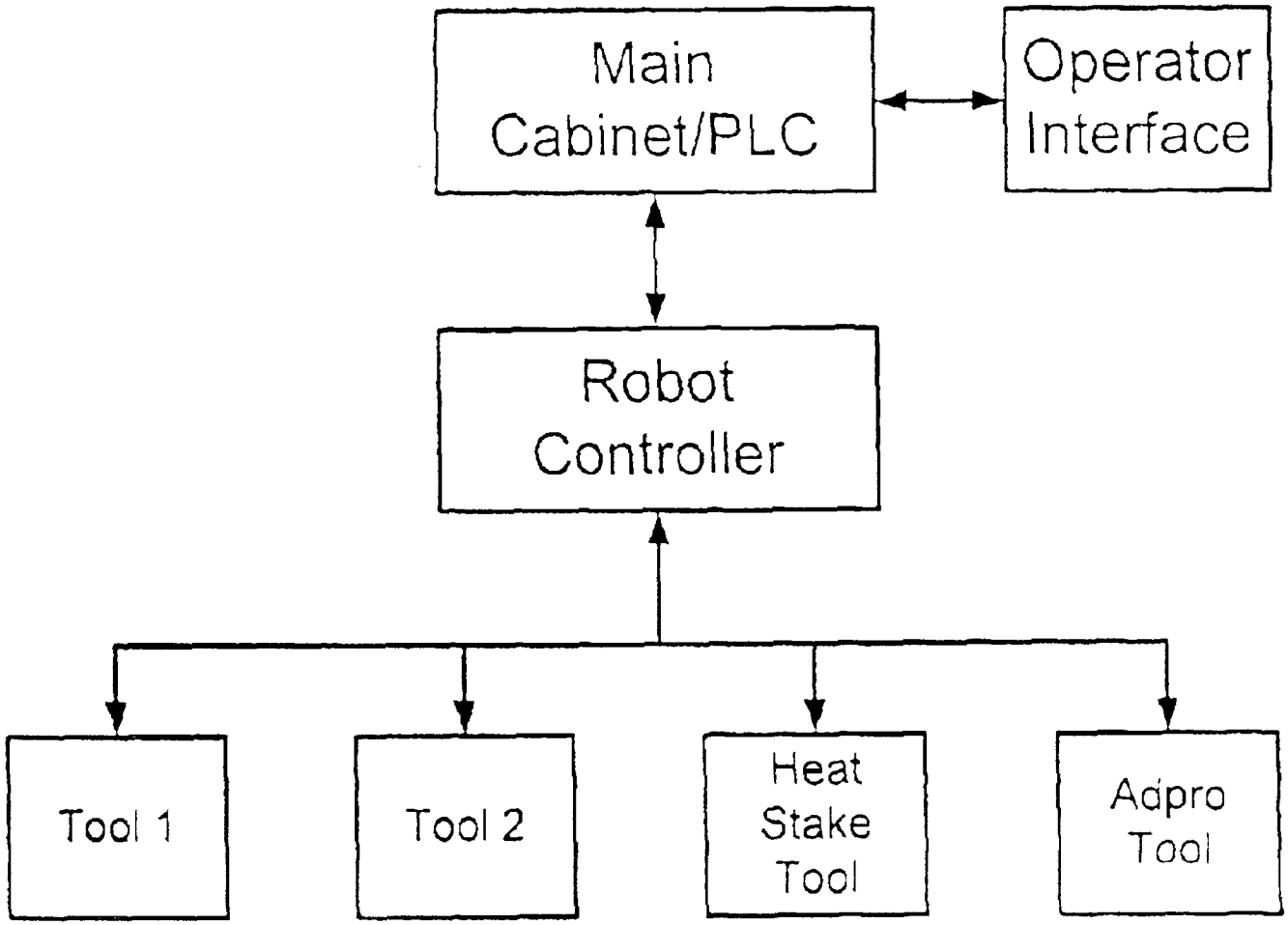
FIG. 6 is a schematic relationship view of the selected components of the invention.

A robotic tape applicator (1) is illustrated in the attached drawings. Prior to applying tape (3), a jig (not illustrated) is prepared into which a body part is placed. The three-dimensional profile of the body part is recorded and stored in computer memory. Using appropriate programming, a path for the tape in three dimensions is determined. The tape applicator head is then oriented so that, under the control of the computer, the head follows the predetermined path. The relationship of the computer to other components of the tape applicator system are illustrated in FIG. 6.

Typically, it is beneficial to lay down a band of liquid activator which serves to make the tape head adhere to the body part strongly once it has contacted the activator and cured briefly. This activator can be applied by hand, or by an activator applicator which is adapted to follow the same path as the tape applicator head.

Figure 1:
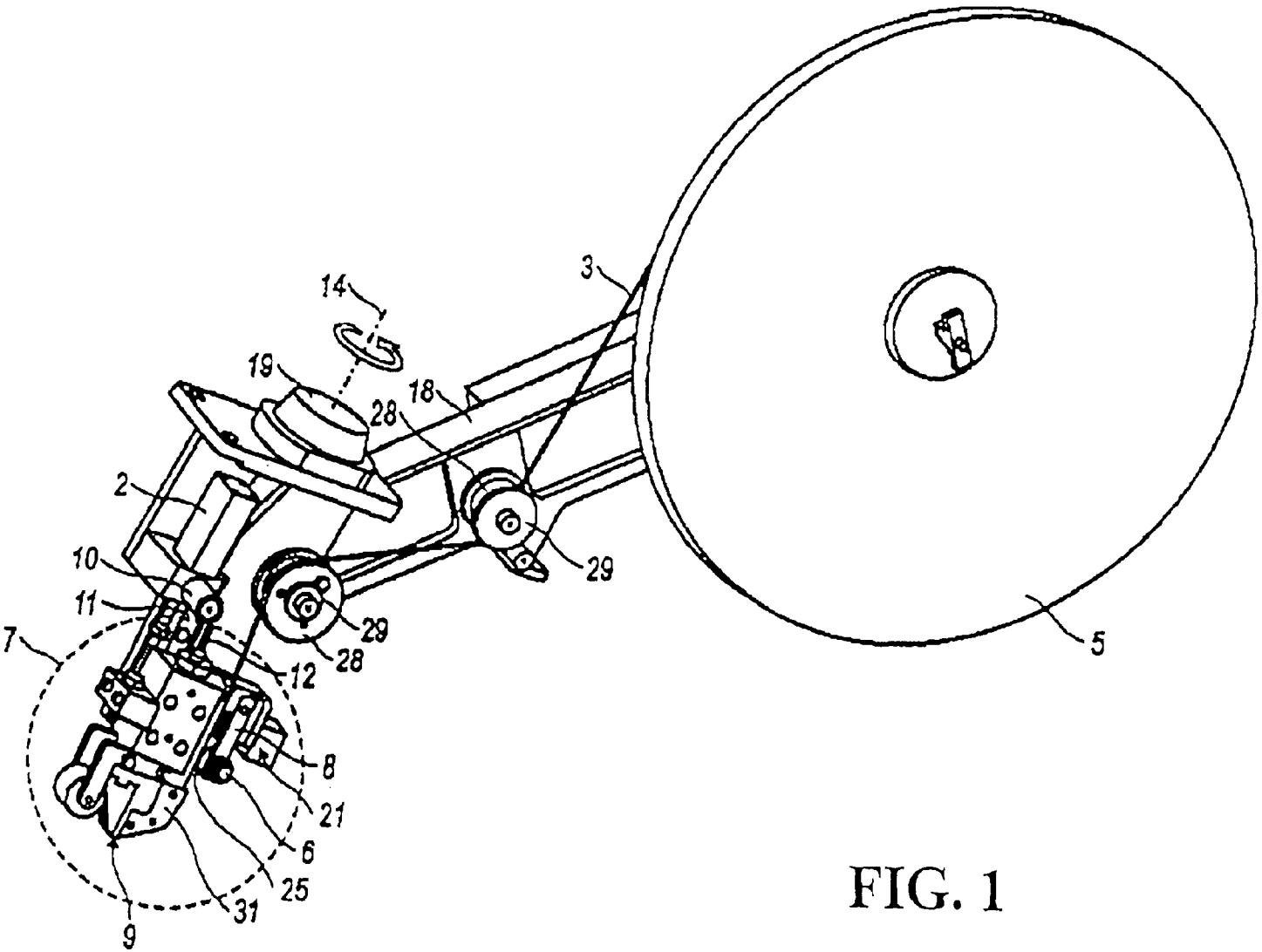
FIG. 1 is a perspective view of the robotic tape applicator of the invention.
Figure 2:
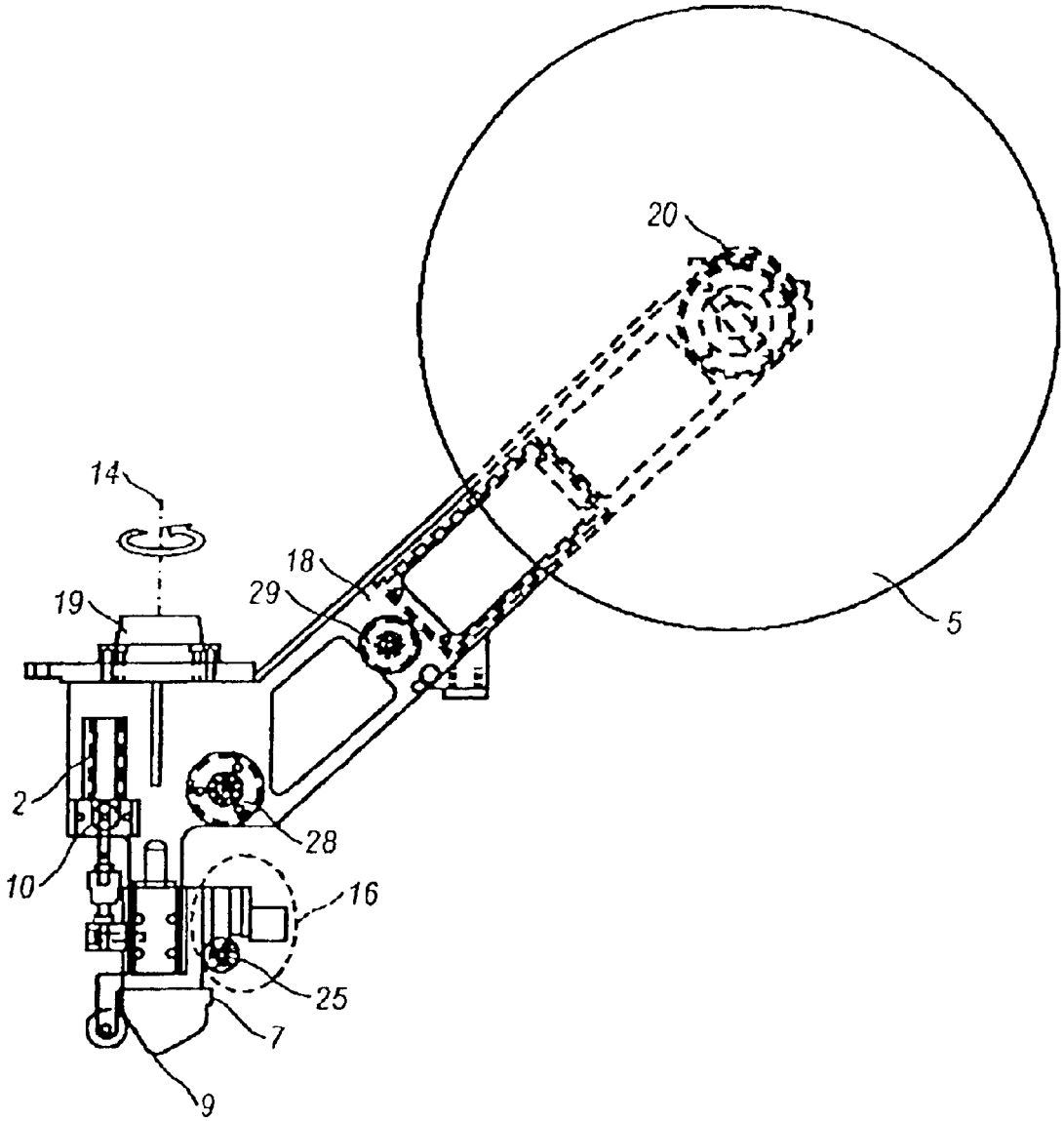
FIG. 2 is a partly cross-sectional side elevation view of the robotic tape applicator of the invention.

Referring to FIGS. 1 and 2, the two-sided tape (3) is rolled on a roller (5) which is mounted onto the applicator device (1) at a main bracket (18). Sensors (20) indicate the amount of tape remaining on a reel or roller. One side of the tape is adhesive while the other side is covered by a non-stick removable covering. The tape is guided along a path through the applicator device to the tape applicator head (7). Tensioning means (16) can be provided along this path in order to ensure that the tape remains under a uniform tension while it is being fed. In addition, braking means (6) can be provided in order to restrain the tape from any movement during certain operations, including cutting of the tape as further described below.

When the robotic tape applicator is placed into operation, the applicator head will proceed to the precise location dictated by its computer controller. The tape application will then begin. Pressure in the head is maintained using an application pressure cylinder (2).

The point of the tape applicator head (7) closest to the body part is referred to as the nose (9) which can be constructed as a nose piece capable of movement independently of the rest of the applicator head. In order to ensure that the tape is applied evenly without damage to the body part, the nose piece (9) is free to move reciprocally up and down in a direction normal to the surface of the work piece. In the preferred embodiment, a linear bearing (11) is provided which allows the nose piece to move vertically in relation to the surface of the body part with a minimum of friction. Irregular motion of the applicator head will introduce uneven tensions into the tape itself, so freedom of vertical motion for the applicator head is generally advantageous.

Figure 3:
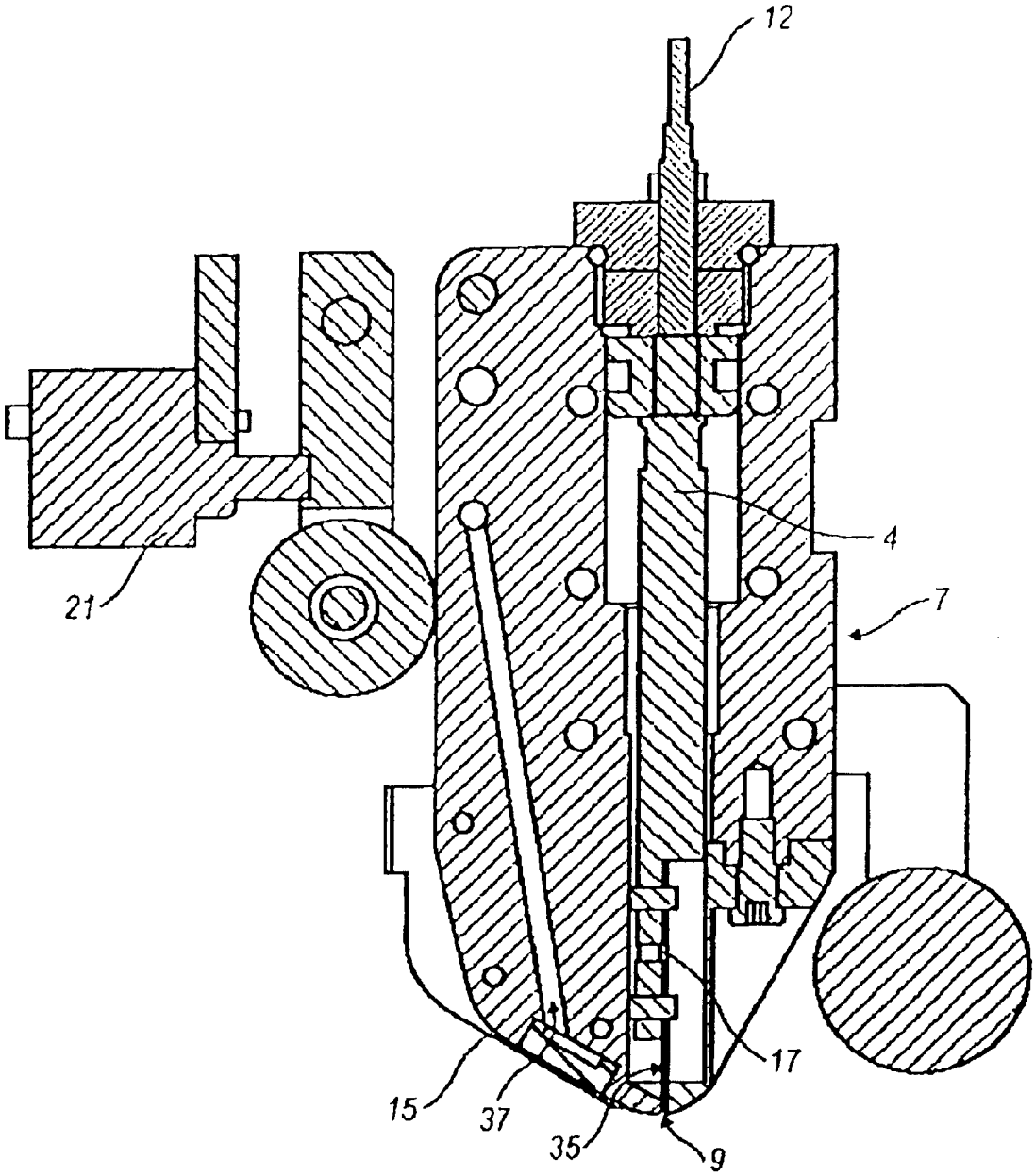
FIG. 3 is a cross-sectional elevation view of the tape applicator head of the invention.
Figure 4:
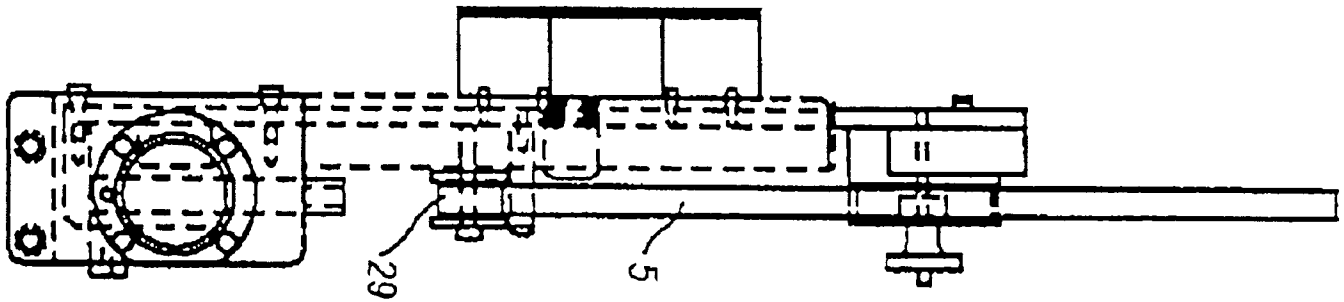
FIG. 4 is an end elevation view in partial cross-section of the robotic tape applicator of the invention.
Figure 5:
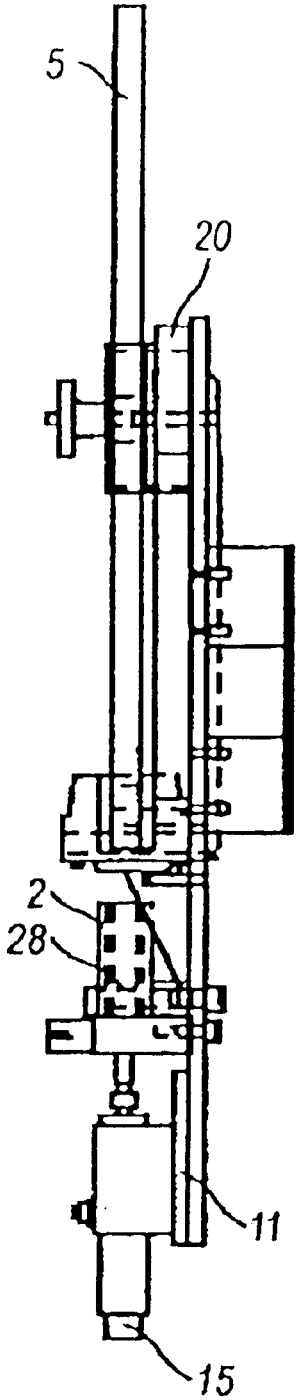
FIG. 5 is an opposite end elevation view in partial cross-section of the robotic tape applicator of the invention.

The amount of downward vertical force on the tape applicator head affects the "wet out" for removal of air bubbles from under the tape. A constant pressure is maintained on the tape applicator head by means of a compliance cylinder (2), typically regulated by hydraulic or pneumatic forces, which assists in effecting the "wet out" and allows the head to be in constant compliance with the body part. In addition, as best seen in FIGS. 3 and 5, lips or projections (15) on the side of the applicator head can be provided to ensure constant compression of the tape. In this case, the vertical dimensions of the lips between which the tape runs are slightly less than the thickness of uncompressed tape so that a defined amount of compression of the tape can be created when the lips are maintained in contact with the body part.

In order to apply tape with as much precision as possible, it is very beneficial to cut the tape while the head remains in contact with the body part so that the tape which has been applied will not be pulled away from the body part. In the preferred embodiment, as illustrated in FIG. 3, a knife blade (17) is provided which is located within the perimeter or external profile of the tape applicator head. More specifically, the knife blade (17) is provided within the perimeter or external profile of the nose (9), as also illustrated in FIG. 3. For certain body parts, it is necessary for the tape applicator head to move within a fairly narrow or confined space, so a small nose on the tape applicator head is beneficial. By incorporating the blade into the nose so that it does not protrude when the tape is in motion, the best results are achieved.

The knife blade operates under the control of a knife blade control piston (4). Referring to FIG. 1, when it is desired to cut the tape, a tape braking assembly (21) presses the tape firmly into contact with a portion of the applicator head. This locks the tape so that as the tape head pulls away from the body part, the tape does not unwind any further from the roll.

Owing to the orientation of the tape as it is laid down, the braking components must be applied against the adhesive side of the tape. Accordingly, it is beneficial to coat the braking means with a non-stick surface so that it will not adhere to the adhesive side of the tape. A spring-loaded lever (8) may pivot in order to trap the tape in this assembly. An air release mechanism (10) releases the brake.

It is beneficial to maintain a constant tension on the tape during tape application. In the preferred embodiment, a nip roller (25) provides a point of constant tape tension regardless of the amount of tape on the roll. As the radius of the tape on the roll decreases, the tension on the tape can vary unless such a tape tensioning means is employed.

In order to keep the tape moving completely in line with the tape applicator head, side guides can be provided. In the preferred embodiment, crown guides (28) on the idler rollers (29) keep the tape moving in a straight line with the applicator head. These side guides can also be covered with a non-stick coating in order to prevent the tape from dragging, thus avoiding unwanted tensions. Side guide plates (31) can be located at one or more locations on the head of the applicator in order to help guide the tape.

As set out above, a spring applied/air release braking means (21) keeps the assembly locked during cutting of the tape in order to prevent tape movement. It is intended that the tape should remain in contact with the body part without any movement after it has been laid down. The compliance cylinder (2) is also locked when the braking means are applied.

If the knife is not fully retracted before the tape is applied, the tape can be cut or scraped in a unwanted manner. Accordingly, in the preferred embodiment, a knife blade sensor (12) is provided to ensure that the knife is fully retracted before tape application commences or recommences.

The shape of the nose can affect the efficiency of tape application. As shown in FIG. 3, a smooth radius at the tip of the non-rotary nose (9) (thus, the smooth radius is non-rotary as well) prevents excess tension in the tape (3). If the centre point (35) of the radius of the nose tip (as shown in FIG. 3) is in line with the roll axis (14) of the robot arm (as shown in FIG. 3) is in line with the roll axis (14) of the robot arm (as shown in FIGS. 1 and 2), optimum results appear to be obtained. The roll axis of the robot is the tool point around which the robot rotates. When the centre point of the radius at the tip of the nose is in line with the roll axis of the robot, it is possible to take advantage of the circular programming functions of the robot to create extremely smooth arcing motions.

In the preferred embodiment, vacuum ports (37) in the applicator head are provided in order to assist the tape to adhere against the surface of the tape applicator head. The vacuum assists in holding the non-adhesive backing cover of the tape to the nose during the taping operation. When vacuum is being drawn, the tape is urged into contact with the tape applicator head by ambient air pressure. Although this vacuum can be turned on and off as required, every such change results in a certain amount of cycling time. Since it is beneficial to reduce cycling times, a constant vacuum can be maintained if it is of a strength which allows the tape to move along its intended path while drawing it into contact with the tape applicator head.

A tool changer (19) is used to change from one tool to another depending on the requirements of the tape application task.

In a particular example of an embodiment of this invention, a Fanuc S-5™ Robot was chosen for the activator and tape application due to the shape and size of the part to be taped. On many of the parts, a large reach combined with the ability to manipulate the tool at a complex tilt is required. The six-axis, articulated robot was programmed based on the nominal contours of the 3-dimensional mathematical part profile data. This was used to generate the basic tool path for the part. Any difference in shape due to moisture content and shrinkage was accommodated by the end of arm tooling. The robot has the capacity to store a multitude of robot paths. On the heat staking station, a five-axis Fanuc A-510™ Robot was used. Other types of robots could have been integrated according to the user's preference.

The robot end of arm tooling used in the three robot workstations consisted of:

1. 1 Activator Application Tool;
2. 10 Tape Application Heads;
3. 1 Heat Staking Head; and
4. 1 Part Pick and Place Gripper Assembly.

The tool was attached to the faceplate of the Activator Application Robot. This tool consisted of a light spring-loaded finger with a replaceable application pad. The activator was pumped to the application gun and circulated back to the activator storage tank by a back pressure relief system. This ensured that the activator was constantly being pumped to reduce the chance of nozzle clogging. The gun located at the end of arm was adapted to shut off the flow of activator at the replaceable pad and to minimize the amount of excess activator dripping off the pad.

The tape application head was adapted to handle five different tape widths. Two tape heads were dedicated to each tape width. In this way, the operator could replenish the tape supply without shutting down the process. The heads were stored in a rack that was easy for the operator to reach from outside the cell location. The heads consisted of:

1. Tape reel and sensors;
2. Tension control;
3. Application pressure cylinder and control valves;
4. Application roller;
5. Tape cut-off knife; and
6. Quick-change tooling.

The operator attached a new roll of tape to the main bracket. The tape was wound through the tension control device and onto the application roller assembly. The replenished head was placed in the tool rack above the conveyor assembly. When the control system detected that the reel was empty, the robot placed the spent head in the rack and released the quick-change tool. The robot moved to the full tape head and captured the quick-change tooling. The robot continued the tape application process as required. This same procedure was used to change between tape sizes on a part that required more than one width of tape.

During the tape application, the system was capable of negotiating curves as well as straight runs of tape. The tape application roller provided the normal force on the tape as it was applied. The tape was cut off at the end of each tape run. The knife was located just in front of the tape application roller. This allowed the tape to be kept in contact with the roller via a vacuum system. The tape was indexed to the start point using an auxiliary actuator prior to the next layout of tape.

At the Heat Stake Station, a 5-axis robot was fitted with a tool changer and two end-effectors. The heat staking and tabbing end-effector were used to automatically apply the tabs to the end of the tape runs. The tabbing material was fed in using a knurled wheel to the correct length. The heat staking iron was attached to a slide cylinder assembly. After the tab material was payed out, the heat staking iron was extended to attach the tab. A cut off knife cut the tab to the correct length. The tabs were used to remove the protective covering on the outward face of the tape.

At the Heat Stake Station, an additional end effector was supplied for sub-assembly operations. The tape liner was manually removed prior to the heat staking cell. Parts were pre-taped and placement of the parts was accomplished using the robot and suction grippers. This end-effector was only used if sub-assembly of components was required. The robot automatically dropped off the heat staking head and picked up the pick and place head.

The plastic parts were placed into a set of part fixtures. These fixtures were part specific. They were bolted to fixture carriers using doweled locations. The fixture type was verified using a set of proximity sensors. This ensured that the correct fixture was being used with the correct robot tool path.

After the part was placed into the fixture, a set of manually actuated clamps held the part firmly in place.

The fixtures were mounted to carriers that were driven by the conveyor system. The conveyor was a flexible, modular plastic chain system. A continuous loop of top running chain was chosen to allow for future expansion of the system. The pallets were located at each station using pallet stops and locator assemblies. Each carrier had an array of proximity sensor targets to verify part and fixture type. Carriers were supported by pallet "Pucks" that sat on the conveyor belt during transport from one station to the next. Each carrier had two pucks that pivoted as the fixture was driven around the corners. Pallet carriers were located at a convenient height for operator loading/unloading.

Although the invention has been described in terms of a preferred embodiment, other embodiments of the invention will be apparent to those skilled in the art of robotics and fastening.

The invention claimed is:

1. A robotic tape applicator comprising:

computer means which includes programmed data respecting the shape of a work piece and the proposed path of the tape to be adhered to the work piece;

tape applicator means under the control of the computer means to apply the tape to the work piece along said path; and means to hold the work piece in registration with the tape applicator means, wherein the tape applicator means further comprises:

a tape applicator head comprising a nose at one end;

a cutting mechanism to cut the tape, wherein the cutting mechanism is integrated within the nose; and a tape braking mechanism that can be applied against the tape to hold the tape stationary during cutting.

2. The robotic tape applicator of claim 1 wherein the tape braking mechanism further comprises a spring-loaded lever to trap the tape.

3. The robotic tape applicator of claim 1, further comprising an activator applicator to apply an activator liquid along the proposed path prior to application to the tape, the activator applicator includes an activator storage tank that stores the activator liquid, an application gun that is coupled to the activator storage tank to receive and apply the activator liquid along the proposed path, and a back pressure relief system coupled to the application gun to circulate the activator liquid back to the activator storage tank.

4. The robotic tape applicator of claim 1, wherein the tape is an adhesive tape.

5. The robotic tape applicator of claim 1 further comprising an additional work piece with the tape fastening the work piece and the additional work piece.

6. The robotic tape applicator of claim 5 wherein the work piece and the additional work piece are parts of a vehicle.

7. The robotic tape applicator of claim 1 wherein the proposed path includes at least one curved section.

8. A robotic tape applicator comprising:

a computer adapted to control a robotic arm according to a program;

the robotic arm comprising:

a roller;

a two-sided adhesive tape residing on the roller;

a guide to guide the tape to a tape applicator head for application to a work piece;

the tape applicator head comprising a nose capable of permitting reciprocal motion in a direction normal to the work piece; and a cutting mechanism integral with the tape applicator head to cut the tape under the control of the computer, wherein the cutting mechanism comprises a knife blade located within the perimeter of the nose when the cutting mechanism is not in operation.

9. The robotic tape applicator of claim 8, wherein the computer used programmed data corresponding to the shape of the work piece and a proposed path of the two-sided adhesive tape to be adhered to the work piece.

10. The robotic tape applicator of claim 8, further comprising a tensioning mechanism located between the roller and the nose and applied against the tape to maintain a uniform tension on the tape.

11. The robotic tape applicator of claim 10, wherein the tensioning mechanism comprises a nip roller.

12. The robotic tape applicator of claim 8, further comprising a braking mechanism arranged to releasably restrain movement of the tape.

13. The robotic tape applicator of claim 12, wherein the braking mechanism comprises a spring-loaded lever to releasably trap the tape.

14. The robotic tape applicator of claim 13, wherein the spring-loaded lever releases the tape under pneumatic pressure.

15. The robotic tape applicator of claim 8, wherein projections located on either side of the nose and extending beyond the leading edge of the nose a distance less than the thickness of the tape are in contact with the work piece while the tape is running between said projections to uniformly compress the tape during tape application.

16. The robotic tape applicator of claim 8, wherein a hydraulically or pneumatically controlled piston in a compliance cylinder maintains a constant pressure on the tape applicator head.

17. The robotic tape applicator of claim 8, further comprising a pneumatic or hydraulic blade control piston to control the knife blade operation.

18. The robotic tape applicator of claim 8, further comprising a knife blade sensor to detect when the knife blade is fully retracted after the tape is cut and to signal the computer so that tape application can resume.

19. The robotic tape applicator of claim 8, further comprising vacuum ports that provide sites of negative pressure against which the tape can be slidably held during application of tape to the work piece.

20. The robotic tape applicator of claim 8, wherein the nose of the tape applicator head comprises a smooth radius, the centre point of which radius lies along a roll axis of the robotic arm.

21. The robotic tape applicator of claim 8, wherein the nose of the tape applicator head comprises a non-rotary radius, the centre point of which radius lies along a roll axis of the robotic arm.

22. The robotic tape applicator of claim 20, wherein the smooth radius is a non-rotary smooth radius.

23. The robotic tape applicator of claim 19, wherein the nose of the tape applicator head comprises a non-rotary radius, the centre point of which radius lies along a roll axis of the robotic arm; and the robotic tape applicator further comprises: vacuum ports that provide sites of negative pressure against which the tape can be slideably held to the non-rotary radius during application of tape to the work piece.

24. The robotic tape applicator of claim 8, wherein the nose of the tape applicator head comprises a non-rotary smooth radius, the centre point of which radius lies along a roll axis of the robotic arm; and the knife blade is retracted from the non-rotary smooth radius of the nose when the cutting mechanism is not in operation.

25. The robotic tape applicator of claim 12, wherein the tape applicator head further comprises a tensioning mechanism located adjacent to the braking mechanism to maintain a uniform tension on the tape.

26. The robotic tape applicator of claim 8, further comprising:

a sensor to detect an amount of the tape remaining on the roller.

27. The robotic tape applicator of claim 8, further comprising:

a linear bearing coupled to the tape applicator head to actuate the nose in reciprocal motion in the direction normal to the work piece.

28. The robotic tape applicator of claim 27, further comprising:

a hydraulically or pneumatically controlled piston in a compliance cylinder capable of maintaining a constant pressure on the tape applicator head; and wherein the linear bearing is arranged between the compliance cylinder and the tape applicator head.

29. The robotic tape applicator of claim 8 further comprising an additional work piece with the tape fastening the work piece and the additional work piece.

30. The robotic tape applicator of claim 7 wherein the work piece and the additional work piece are parts of a vehicle.

31. The robotic tape applicator of claim 8 wherein the proposed path includes at least one curved section.

* * * * *